US007328704B2

(12) United States Patent
Voorhees

(10) Patent No.: US 7,328,704 B2
(45) Date of Patent: Feb. 12, 2008

(54) HANDCUFF CALIPERS

(76) Inventor: R. John Voorhees, 1383 E. 850 North, Layton, UT (US) 84040

(*) Notice: Subject to any disclaimer, the term of this patent is extended or adjusted under 35 U.S.C. 154(b) by 323 days.

(21) Appl. No.: 11/109,252

(22) Filed: Apr. 18, 2005

(65) Prior Publication Data

US 2005/0257581 A1 Nov. 24, 2005

Related U.S. Application Data

(60) Provisional application No. 60/566,895, filed on Apr. 29, 2004.

(51) Int. Cl.
*A61G 15/00* (2006.01)
*E05B 75/00* (2006.01)
*A01K 15/04* (2006.01)

(52) U.S. Cl. .......................... 128/845; 70/16; 119/726

(58) Field of Classification Search ............... 128/869, 128/876, 878, 879; 70/16–18; 119/856, 119/857, 863, 770
See application file for complete search history.

(56) References Cited

U.S. PATENT DOCUMENTS

| | | | | |
|---|---|---|---|---|
| 4,977,625 | A | | 12/1990 | Charters, III |
| 5,613,381 | A | | 3/1997 | Savage |
| 6,151,761 | A | * | 11/2000 | Thompson ................ 24/16 PB |
| 2005/0262889 | A1 | * | 12/2005 | Parsons et al. ................ 70/16 |

* cited by examiner

*Primary Examiner*—Patricia Bianco
*Assistant Examiner*—Tarla Patel
(74) *Attorney, Agent, or Firm*—Thorpe North & Western

(57) ABSTRACT

A restraint device includes a closable loop to circumscribe a wearer's limb and defining an inner opening having a plurality of sizes. An indicator scale is associated with the loop to indicate the size of the opening in a closed configuration. The size indicated by the indicator scale can be documented or recorded for future reference.

14 Claims, 4 Drawing Sheets

HANDCUFF CALIPERS

PRIORITY CLAIM

Benefit is claimed of U.S. Provisional Patent Application No. 60/566,895, filed Apr. 29, 2004, which is herein incorporated by reference.

BACKGROUND OF THE INVENTION

1. Field of the Invention

The present invention relates generally to restraint devices, such as handcuffs, shackles, manacles, and the like.

2. Related Art

It is sometimes necessary to restrain certain individuals in various situations. Such individuals can include criminals, suspects, the violent or mentally ill, etc. Reasons for such restraint can include resisting escape, resisting injury to the restrainee or restrainer, etc. Various institutions utilize restraint, including law enforcement agencies, prison facilities, correctional facilities, asylums, etc.

It is desirable to provide such restraint without causing injury to the restrainee. It will be appreciated that the act of, and circumstances leading to, restraint can require using force to overcome the restrainee, and thus easily lead to injury. The devices used to restrain, such as handcuffs, can also cause injury to the restrainee, such as if over tightened. Many restrainees claim injury at the hands of the restrainer, including injury do to the restraining device. Such claims can lead to law suits resulting in defense costs.

SUMMARY OF THE INVENTION

It has been recognized that it would be advantageous to develop a method and device to limit claims of abuse, and resulting cost associated with defending such actions. In addition, it has been recognized that it would be advantageous to document or otherwise provide proof of the nature of the restraining device. Furthermore, it has been recognized that it would be advantageous to develop a method and device for documenting the tightness or size of the restraining device used.

The invention provides a restraint device with a closable loop configured to circumscribe a wearer's limb, and defining an inner opening having a plurality of sizes. An indicator scale is associated with the loop and indicates the size of the opening.

In accordance with another more detailed aspect of the present invention, the loop can be a lockable loop, or can include means for locking the loop against unauthorized opening, including for example, a key lock, one-way teeth, etc. In addition, the loop can include a plurality of teeth disposed on the closeable loop. Furthermore, the restraining device can further include means for securing the closable loop to another object different than the wearer's limb, including for example, a chain, a cable, a strap, etc. The loop can be secured to furniture, structure, vehicle, another limb or body part, etc.

In accordance with another more detailed aspect of the present invention, the indicator scale can include indicia disposed on the loop. The plurality of teeth can be associated with a size of the indicator scale. The indicia can be permanently marked on the loop by a marking method, such as laser marking (laser engraving or laser annealing), electrochemical etching, electrochemical deposition, chemical etching, mechanical displacement of parent material, stamping, vibro-peening, roll marking, engraving, cold forging, printing, and painting. Other methods may be used.

In accordance with a more detailed aspect of the present invention, the closable loop can have a pair of opposite ends that are couplable together in a closed configuration. The indicator scale can include indicia disposed on one end of the loop, and an indicator mark disposed on another end of the loop. The indicia can include a plurality of markings, and the indicator mark can be alignable with one of the plurality of markings to indicate the size of the loop.

In accordance with a more detailed aspect of the present invention, the loop can further include a pair of rigid braces having pivot ends pivotally coupled together to allow the braces to pivot with respect to one another between an open configuration and a plurality of closed configurations having different sizes, and having opposite ends opposite the pivot ends. A lock can be associated with the pair of braces to releasably secure the opposite ends of the braces in the closed configurations. The indicator scale can include a plurality of markings disposed on one of the braces. The plurality of markings can correspond to different sizes in the closed configurations. An indicator mark can be formed on another of the braces and can be alignable with the plurality of markings in the closed configurations to indicate the size. Furthermore, the pair of braces can be a first pair of braces, and a second pair of braces can be coupled to the first pair of braces.

In accordance with a more detailed aspect of the present invention, the loop can further include further include a flexible strap with opposite ends, and means for securing the opposite ends together in a plurality of closed configurations having different sizes. The indicator scale can include a plurality of markings disposed on the strap. The plurality of markings corresponds to different sizes of the strap in the closed configurations. In addition, a plurality of ridges can be formed on one end of the strap that is insertable into an opening on another end of the strap. The opening can include a flexible finger engaging the plurality of ridges to secure the strap against movement in the opening. Furthermore, the restraining device can include a pair of loops secured together.

The invention also provides a method for determining a configuration of a restraining device, including: securing a restraining device around a limb of a retainee; and observing an indicator scale associated with the restraining device indicating a size of an opening formed by the restraining device around the limb of the retainee. The method can further include documenting the size observed as indicated by the indicator scale. The method can further include maintaining the size of the opening formed by the restraining device.

The invention also provides a method for making a restraint device with a size indicator, comprising the steps of: providing a restraint device having a closable loop having a pair of opposite ends that are couplable together in a closed configuration; and marking one end of the closable loop with an indicator scale having a plurality of markings to indicate the size of the loop Additional features and advantages of the invention will be apparent from the detailed description which follows, taken in conjunction with the accompanying drawings, which together illustrate, by way of example, features of the invention.

DETAILED DESCRIPTION

Figure 1:
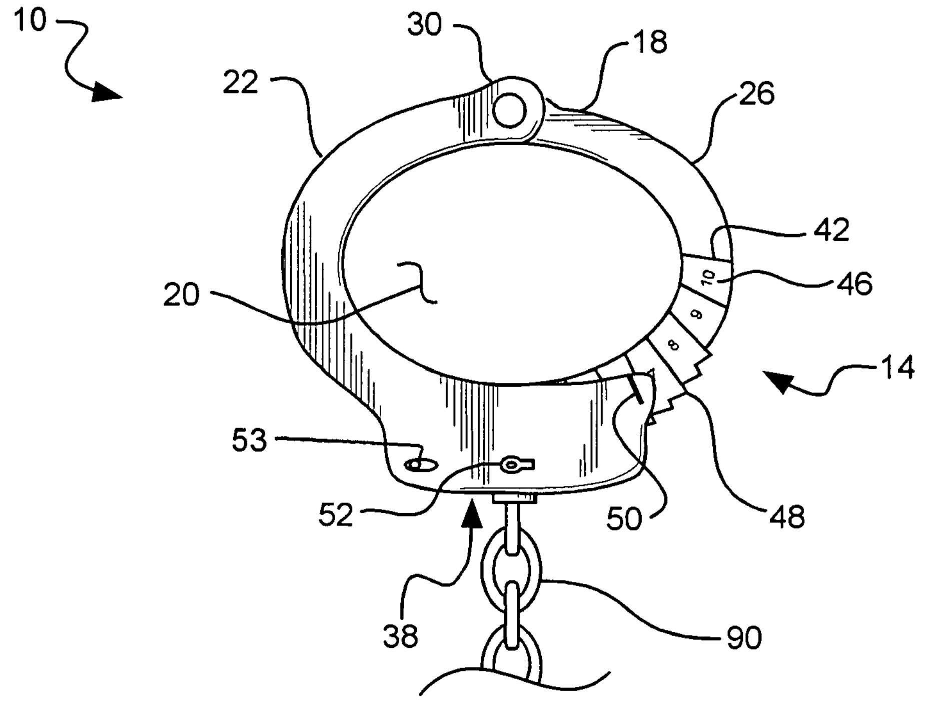
FIG. 1 is a partial top view of a restraining device or handcuff in accordance with an embodiment of the present invention, shown in a closed configuration.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
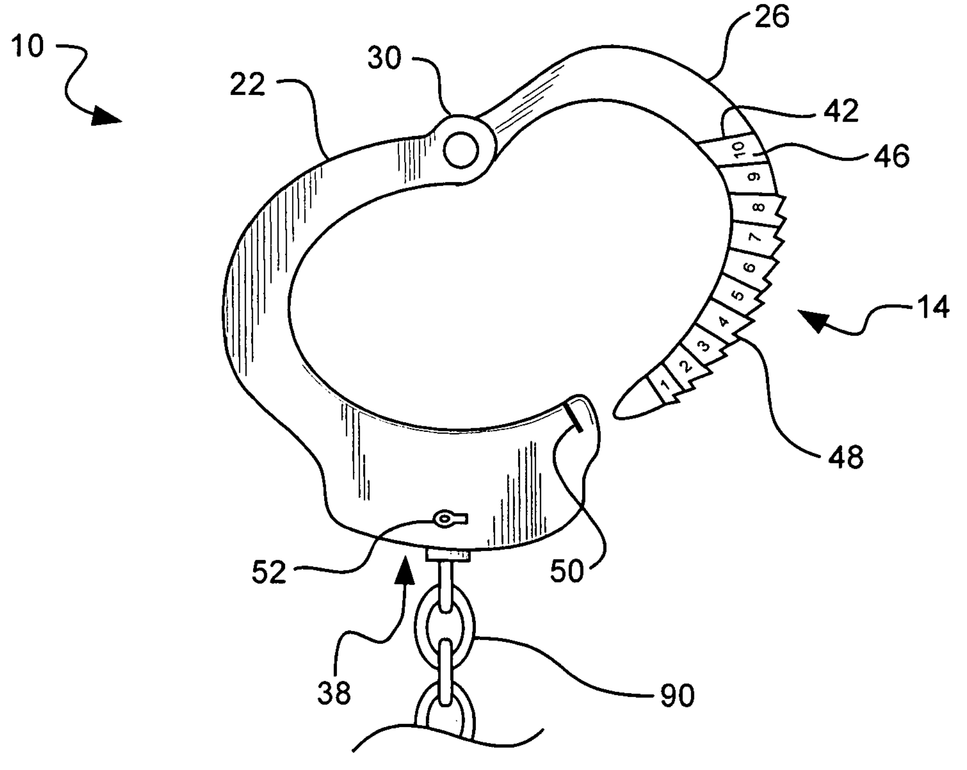
FIG. 2 is a partial top view of the restraining device or handcuff of FIG. 1, shown in an open configuration.

As illustrated in FIGS. 1-2, a restraining device or handcuff, indicated generally at 10, in accordance with the present invention is shown for use in restraining a restrainee. The restraining device 10 advantageously has an indicator scale, indicated generally at 14, to indicating the size and/or tightness of the restraining device. Therefore, the size or tightness of the restraining device can be observed or noted, and documented or recorded, to provide future evidence or proof of the configuration of the restraining device as used on the restrainee. It will be appreciated that if a restrainee later alleges injury or abuse as a result of the restraining device, such as being overly tight, the size or tightness of the restraining device can be determined from the records and demonstrated, to show that the restraining device was properly used and that the retainee was not abused or that the restraint was not improperly used.

Figure 3:
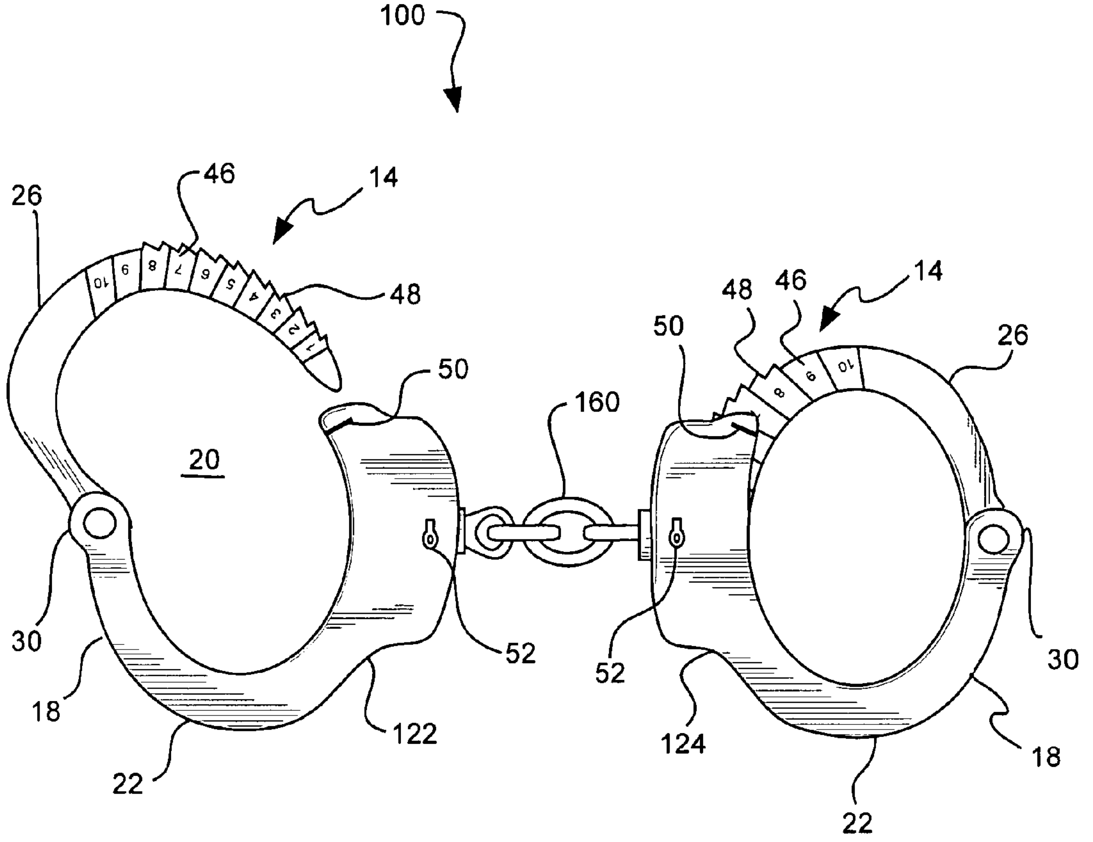
FIG. 3 is top view of the restraining device or handcuff of FIG. 1 in accordance with another embodiment of the present invention.

The restraining device or handcuff 10 can form a closable loop 18 configured to circumscribe a wearer's wrist or limb, and can define an inner opening 20 that can have a plurality of different sizes in the closed configuration (FIG. 1). The handcuff 10 or loop 18 can have an open configuration as shown in FIG. 2, and a plurality of closed configurations, one of which is shown in FIG. 1. The closed configuration can have a plurality of sizes corresponding to the size of the wearer's wrist or limb. Thus, the loop 18 can be adjustable, or the inner opening 20 can be adjustable, to provide the different sizes. It can then be locked and/or double locked (to prevent not only loosening, but tightening as well) at a specific size. It will be appreciated that such a device can be used on the wearer's wrist, or on another limb, such as an ankle. The restraining device or handcuff 10 can include a single loop, and can be secured to another object, such as a table, a bed, other furniture, a wall, a floor, other structures, a vehicle, another chain or cable, another loop circumscribing another limb, etc. Thus, a single loop can circumscribe the wearer's limb, and secure that limb to furniture, structures, vehicles, another limb or body part, etc. The loop can be secured to another object by a chain or cable 90. The chain or cable is an example of one means for securing the closable loop to another object different than the wearer's limb. In addition, a restraining device or handcuff 100 can include a pair of closable loops 18 secured together, as shown in FIG. 3, such as with a chain or cable, so that the wearer's wrists, or limbs, can be secured together.

Referring again to FIGS. 1 and 2, the loop 18 can include a pair of rigid braces 22 and 26 pivotally coupled together. The braces 22 and 26 can be formed from any suitably rigid material, such as metal. One of the braces 26 can be a single flat member, while another brace 22 can include two spaced-apart members. The braces 22 and 26 can have pivot ends 30 pivotally coupled together to allow the braces 22 and 26 to pivot with respect to one another between the open and closed configurations. The pivotal connection can be formed by a pivot or hinge, and can include a pivot or axel, such as by a rivet or other fastener. In addition, the braces 22 and 26 can have opposite ends or free ends 34 and 36 that can be releasably secured together in the closed configuration. The opposite ends 34 and 36 of the braces can form ends of the loop 18.

The loop 18 can be a lockable loop, and can include a lock, indicated generally at 38, as is known in the art. The lock 38 can include a plurality of teeth 48 on one brace 26 that are engaged by a pawl or locking mechanism on the other brace 22, as is known in the art. The pawl or locking mechanism can be disposed between the two spaced-apart members. One of the braces 22 can include a key hole 52 to receive a key to disengage the pawl, or unlock the lock. The restraining device can also include a lock or a double lock 53 that maintains the loop or braces in a desired configuration, i.e. so that they cannot be further tightened, as is known in the art. Requiring a key to unlock the loop helps resist against unauthorized opening of the loop, or makes the loop selectively openable. In addition, requiring a key or similar device to further tighten the device helps resist over tightening and injury. The plurality of teeth provides a plurality of discrete sizes to the loop as the teeth progressively pass through the other end, or through the locking mechanism. The teeth and pawl or locking mechanism is an example of one means for locking the loop 18 against unauthorized opening, or means for securing the opposite ends 34 and 36 together in a plurality of closed configurations having different sizes. The pair of braces is one example of means for lockably circumscribing a wearer's limb with a plurality of different sizes.

The indicator scale 14 can be associated with the loop 18 or braces 22 and 26, and can indicate the size of the loop, or the position of the braces. The indicator scale 14 can include indicia 42 formed on the loop or braces, or on one of the ends thereof. The indicia 42 can include markings 46 that indicate size, such as numbers. The markings can correspond to the actual size, or can be an arbitrary scale. The indicia 42 or scale can be disposed on one end of the loop or brace. An indicator mark 50 can be disposed on another end of the loop or brace. The indicator mark 50 can align with one of the markings 46 to indicate the size of the loop, or position of the braces. The indicia and indicator mark is one example of means for indicating the sizes of the closed configurations.

The indicia 42 and markings 46 can be permanently marked on the loop 18 by mechanical displacement of the parent material of the loop 18. Mechanical displacement of parent material can be accomplished by stamping, cold forging, roll marking, vibro-peening, engraving, or other material displacement methods as known in the art. It will be appreciated that other suitable marking methods can also be used, such as laser marking (laser engraving or laser annealing), electrochemical etching, electrochemical deposition, chemical etching, and indelible ink or paint marking.

In use, the restraining device or handcuff 10, or loop 18 or braces 22 and 26, is secured around a limb of a retainee. For example, the braces 22 and 26 can be pivoted with one brace 26 moving or pivoting with respect to the other brace 22. As the loop 18 tightens, the scale 14 or markings 46 rotate or move past the indicator mark 50. The loop 18 can be closed until the desired tightness is achieved, or in accordance with guidelines. The loop can also be locked in that position or tightness to prevent further tightening or closing, such as with a double lock, as is known in the art. The indicator scale 14 or mark 50 can then be observed and recorded. As stated above, the mark 50 or scale 14 can indicate the size or diameter of the loop. As is known in the art, the loop 18 or braces 22 and 26 can be maintained in the indicated size or position.

The plurality of teeth 48 can be associated with the indicator scale 14 so that each tooth is associated with a specific size of the indicator scale 14. Thus, as each tooth is engaged by the lock 38, the indicator 50 indicates a specific size marking 46.

As illustrated in FIG. 3, a restraining device or pair of handcuffs, indicated generally at 100, is shown which is similar in many respects to the restraining device 10 shown in FIGS. 1-2 and described above. The restraining device 100 can include a pair of loops 18 can have a first pair of braces 122 and a second pair of braces 124 secured together. The braces 122 and 124 can be secured together by a chain 160, cable or hinge. It will be appreciated that other suitable joining devices can be used to secure the common braces 122 and 124 together, such as hinges, straps, or cables, as is known in the art. The restraining device 100 allows for simultaneous restraint of more than one limb of a retainee. Each loop can have an indicator scale, as described with respect to FIGS. 1 and 2, which can indicate the size of the various closed configurations of the loop.

Figure 4:
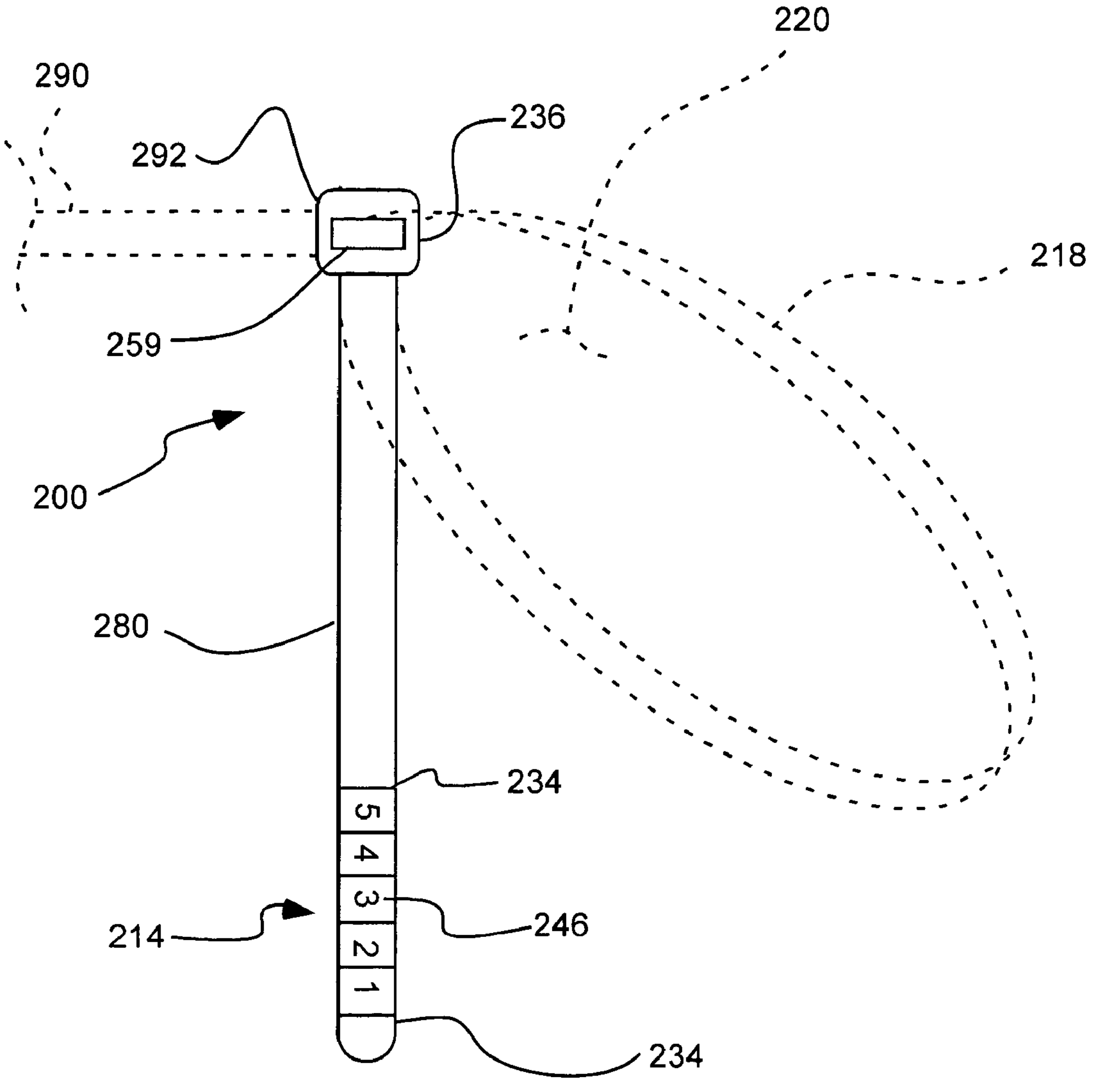
FIG. 4 is a top view of another restraining device in accordance with an embodiment of the present invention, shown in an open configuration, with a closed configuration shown in dashed lines.

Referring to FIG. 4, another restraining device 200 is shown that includes a closable loop 218, indicated by dashed lines, formed by a flexible strap 280 with opposite ends 234 and 236. The strap can be formed of a flexible material, such as nylon, etc. One end or portion of the loop can have an opening 292 for receiving the end 234. A plurality of teeth or ridges can be formed in the strap, and can be engagable by a locking member, such as a flexible finger, in the opening 292, so that the strap can pass through the opening in one direction, but is prevented from passing through in the other direction, as is known in the art. Resisting the teeth or ridges from passing out of the openings insures against unauthorized opening of the loop, and makes the loop selectively openable. For example, it may be necessary to cut the strap when the restraining device is no longer necessary. Thus, the plurality of teeth or ridges provides a plurality of discrete sizes to the loop 218 as the teeth or ridges pass the opening or finger. The teeth engageable by a flexible finger in a loop is an example of one means for locking the loop against unauthorized opening, or means for securing the opposite ends 234 and 236 together in a plurality of closed configurations having different sizes. The strap is one example of means for lockably circumscribing a wearer's limb with a plurality of different sizes. An indicator scale 214 can include a plurality of markings 246 disposed on one end 234 of the strap. The opening 292 can include or form an indicator 250 to align with the markings 246. The indicia and indicator is one example of means for indicating the sizes of the closed configurations. The restraining device 200 or strap 280 can be configured to form a pair of loops, as is known in the art, and as shown.

The restraining device 200 or loop 218 or strap 280 can include a single loop, and can be secured to another object, such as a table, a bed, other furniture, a wall, a floor, other structures, a vehicle, another chain or cable, another loop circumscribing another limb, etc. Thus, a single loop can circumscribe the wearer's limb, and secure that limb to furniture, structures, vehicles, another limb or body part, etc. The loop can be secured to another object by a cable or another strap 290. The cable or another strap is an example of one means for securing the closable loop to another object different than the wearer's limb.

Figure 5:
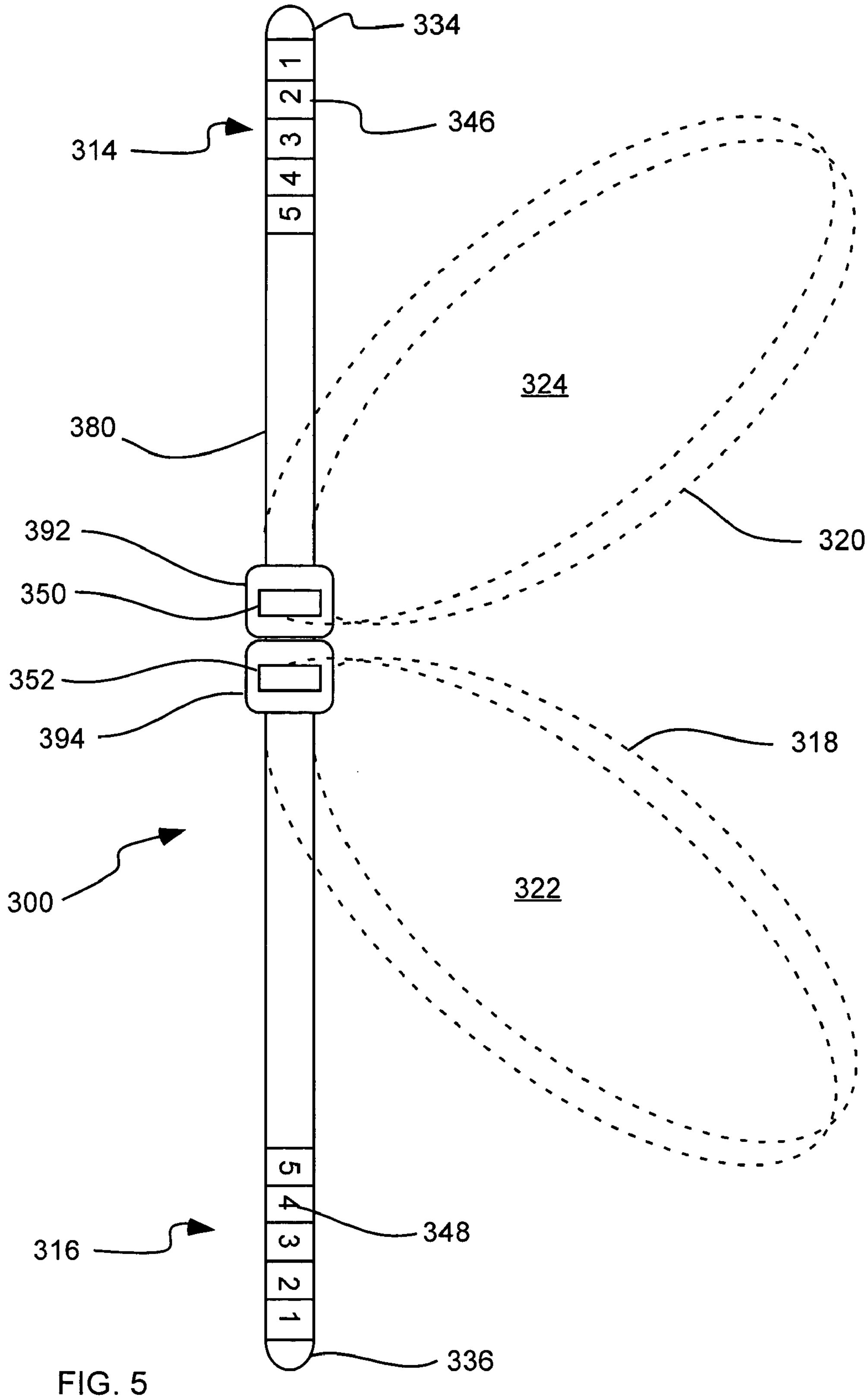
FIG. 5 is a top view of another restraining device in accordance with another embodiment of the present invention, shown in an open configuration, with a closed configuration shown in dashed lines.

As illustrated in FIG. 5, a restraining device 300 is shown which is similar in many respects to the restraining device 200 shown in FIG. 4 and described above. The restraining device 300 can include a strap 380 with a pair of openings 392 and 394 for receiving the ends 334 and 336 respectively. The strap 380 can be configured to form a pair of loops 318 and 320 with openings 322 and 324 by disposing the ends 334 and 336 through the openings 392 and 394, as is known in the art, and as shown by dashed lines in FIG. 5. The strap 380 can include indicator scales 314 and 316 on each end 334 and 336. Each opening 392 and 394 can have or form indicators 350 and 352 to align with the markings 346 and 348. The restraining device 300 allows for simultaneous restraint of more than one limb of a retainee. The strap can be flexible, and can be formed of a strong, flexible material, such as nylon.

A method for making a restraint device as described herein includes providing a restraining device 10, 100, 200 or 300. The restraining device can have a closable loop 18, 218, 318 or 320 having a pair of opposite ends which can be coupled together. An indicator scale 14, 214, 314 or 316 can be formed on the ends of the closable loop. The indicator scale can have a plurality of markings that can indicate the size of the loop. The other end of the closeable loop can be marked with an indicator mark that is alignable with the plurality of markings to indicate the size of the loop in a closed configuration.

A method for determining a configuration of a restraining device as described herein includes securing a restraining device 10, 100, 200 or 300, around a limb of a retainee. (The restraining device can be locked and/or double locked against opening or further closing.) An indicator scale 14, 214, 314 or 316, associated with the restraining device, can be observed to determine the size of an opening 20, 220, 318 or 320 formed by the restraining device around the limb of the retainee. The size indicated by the indicator scale can be documented or recorded for future reference. The size of the opening formed by the restraining device can be maintained while it is retaining a retainee, such as with a double lock.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A restraint device, comprising:

a) a closable loop, configured to circumscribe a wearer's limb, defining an inner opening having a plurality of sizes, the closable loop including:

a pair of rigid braces having pivot ends pivotally coupled together to allow the braces to pivot with respect to one another between an open configuration and a plurality of closed configurations having different sizes, and having opposite ends opposite the pivot ends;

a lock, associated with the pair of braces, to releasably secure the opposite ends of the braces in the closed configurations; and b) an indicator scale, associated with the loop, indicating the size of the opening and including a plurality of markings disposed on one of the braces, the plurality of markings corresponding to different sizes in the closed configurations, and an indicator mark formed on another of the braces and alignable with the plurality of markings in the closed configurations to indicate the size.

2. A restraint device in accordance with claim 1, further comprising means for securing the closable loop to another object different than the wearer's limb.

3. A restraint device in accordance with claim 1, wherein the indicia is permanently marked on the loop by a marking method selected from the group consisting of:

a. laser marking,
b. electrochemical etching,
c. electrochemical deposition,
d. chemical etching,
e. mechanical displacement of parent material,
f. stamping,
g. vibro-peening,
h. roll marking,
i. engraving,
j. cold forging,
k. printing, and
l. painting.

4. A restraint device in accordance with claim 1, further comprising a plurality of teeth disposed on the closeable loop.

5. A restraint device in accordance with claim 4, wherein the plurality of teeth is associated with a size of the indicator scale.

6. A restraint device in accordance with claim 1, wherein the pair of braces is a first pair of braces, and further comprising a second pair of braces coupled to the first pair of braces.

7. A method for determining a configuration of a restraining device, comprising the steps of:

securing a restraining device around a limb of a retainee, the restraining device including a pair of rigid braces having pivot ends pivotally coupled together to allow the braces to pivot with respect to one another between an open configuration and a plurality of closed configurations having different sizes, and having opposite ends opposite the pivot ends;

a lock, associated with the pair of braces, to releasably secure the opposite ends of the braces in the closed configurations; and observing an indicator scale associated with the restraining device indicating a size of an opening formed by the restraining device around the limb of the retainee, the indicator scale including a plurality of markings disposed on one of the braces, the plurality of markings corresponding to different sizes in the closed configurations, and an indicator mark formed on another of the braces and alignable with the plurality of markings in the closed configurations to indicate the size.

8. A method in accordance with claim 7, further comprising the step of:

documenting the size observed as indicated by the indicator scale.

9. A method in accordance with claim 7, further comprising the step of:

maintaining the size of the opening formed by the restraining device.

10. A method for making a restraint device with a size indicator, comprising the steps of:

providing a restraint device having a closable loop having a pair of opposite ends that are couplable together in a closed configuration, the restraint device including a pair of rigid braces having pivot ends pivotally coupled together to allow the braces to pivot with respect to one another between an open configuration and a plurality of closed configurations having different sizes, and having opposite ends opposite the pivot ends, the restraint device further including a lock, associated with the pair of braces, to releasably secure the opposite ends of the braces in the closed configurations; and marking one end of the closable loop with an indicator scale having a plurality of markings to indicate the size of the loop, the indicator scale including a plurality of markings disposed on one of the braces, the plurality of markings corresponding to different sizes in the closed configurations, and an indicator mark formed on another of the braces and alignable with the plurality of markings in the closed configurations to indicate the size.

11. A method in accordance with claim 10, wherein the step of marking further includes marking utilizing a marking method selected from the group consisting of:

a. laser marking,
b. electrochemical etching,
c. electrochemical deposition,
d. chemical etching,
e. mechanical displacement of parent material,
f. stamping,
g. vibro-peening,
h. roll marking,
i. engraving,
j. cold forging,
k. printing, and
l. painting.

12. A restraint device, comprising:

a first pair of braces coupled to a second pair of braces, each pair of braces defining an inner opening having a plurality of sizes and configured to circumscribe a wearer's limb, each pair of braces including:

a pair of rigid braces having pivot ends pivotally coupled together to allow the braces to pivot with respect to one another between an open configuration and a plurality of closed configurations having different sizes, and having opposite ends opposite the pivot ends;

a lock, associated with the pair of braces, to releasably secure the opposite ends of the braces in the closed configurations; and an indicator scale, associated with the pair of braces, indicating the size of the opening and including a plurality of markings disposed on one of the braces, the plurality of markings corresponding to different sizes in the closed configurations, and an indicator mark formed on another of the braces and alignable with the plurality of markings in the closed configurations to indicate the size.

13. A restraint device in accordance with claim 12, wherein each of the pair of braces further includes a plurality of teeth disposed on one of the braces.

14. A restraint device in accordance with claim 13, wherein the plurality of teeth is associated with a size of the indicator scale.

* * * * *